(12) United States Patent
Kim et al.

(10) Patent No.: US 7,241,535 B2
(45) Date of Patent: Jul. 10, 2007

(54) ELECTROLYTE FOR LITHIUM-SULFUR BATTERIES AND LITHIUM-SULFUR BATTERIES COMPRISING THE SAME

(75) Inventors: Seok Kim, Cheonan (KR); Yongju Jung, Cheonan (KR); Yunsuk Choi, Cheonan (KR); Jandee Kim, Cheonan (KR); Soo Seok Choi, Cheonan (KR)

(73) Assignee: Samsung SDI Co., Ltd., Suwon-si (KR)

( * ) Notice: Subject to any disclaimer, the term of this patent is extended or adjusted under 35 U.S.C. 154(b) by 562 days.

(21) Appl. No.: 10/096,663

(22) Filed: Mar. 14, 2002

(65) Prior Publication Data
US 2003/0073005 A1 Apr. 17, 2003

Related U.S. Application Data

(60) Provisional application No. 60/328,807, filed on Oct. 15, 2001.

(51) Int. Cl.
*H01M 10/40* (2006.01)

(52) U.S. Cl. ............. 429/324; 429/188; 429/199; 429/328; 429/329; 429/340

(58) Field of Classification Search ............. 429/324, 429/326–329, 337, 339–341, 188, 199; 252/62.2
See application file for complete search history.

(56) References Cited

U.S. PATENT DOCUMENTS

| | | | |
|---|---|---|---|
| 4,643,958 | A | 2/1987 | Thrash et al. |
| 4,889,779 | A | 12/1989 | Connolly et al. |
| 5,827,602 | A | 10/1998 | Koch et al. |
| 5,965,054 | A | 10/1999 | McEwen et al. |
| 6,030,720 | A | 2/2000 | Chu et al. |
| 6,171,522 | B1 | 1/2001 | Michot et al. |
| 6,358,643 | B1 * | 3/2002 | Katz et al. ............. 429/105 |
| 2002/0045102 | A1 | 4/2002 | Jung et al. |

FOREIGN PATENT DOCUMENTS

| | | |
|---|---|---|
| CN | 1336696 | 2/2002 |
| JP | 11-307121 | * 11/1999 |

OTHER PUBLICATIONS

Data sheet on 1,2-Dimethyl-3-propylimidazololium tris (trifluoromethylsulfonyl) methide [online: retrieved on Aug. 11, 2006] <URL: http://www.sigmaaldrich.com/catalog/search/ProductDetail/FLUKA/74305>.*
Data sheet on Propylene carbonate [online: retrieved on Aug. 11, 2006] <URL: http://www.sigmaaldrich.com/catalog/search/ProductDetail/ALDRICH/P52652>.*
Data sheet on Dimethyl carbonate [online: retrieved on Aug. 14, 2006] <URL: http://www.sigmaaldrich.com/catalog/search/ProductDetail/ALDRICH/D152927>.*

* cited by examiner

*Primary Examiner*—Jonathan Crepeau
(74) *Attorney, Agent, or Firm*—Stein, Mcewen & Bui, LLP

(57) ABSTRACT

A lithium-sulfur battery includes a positive electrode having at least one positive active material selected from the group consisting of an elemental sulfur, $Li_2S_n$ ($n \geq 1$), $Li_2S_n$ ($n \geq 1$) dissolved in catholytes, an organosulfur compound, and a carbon-sulfur polymer (($C_2S_x)_n$: x=2.5~50, n≥2), an electrolyte having salts of an organic cation, and a negative electrode having a negative active material selected from the group consisting of a material capable of reversibly intercalating/deintercalating lithium ions, a material capable of reversibly forming a lithium-containing compound by a reaction with lithium ions, a lithium metal, and a lithium alloy.

46 Claims, 4 Drawing Sheets

ELECTROLYTE FOR LITHIUM-SULFUR BATTERIES AND LITHIUM-SULFUR BATTERIES COMPRISING THE SAME

CROSS-REFERENCE TO RELATED APPLICATIONS

This application claims the benefit of U.S. Provisional Application No. 60/328,807, and filed Oct. 15, 2001 in the U.S. Patent and Trademark Office, the disclosure of which is incorporated herein by reference.

BACKGROUND OF THE INVENTION

1. Field of the Invention

The present invention relates to lithium-sulfur batteries, and more specifically, to an electrolyte for use in a lithium-sulfur battery having excellent electrochemical properties such as battery capacity, high rate performance, cycle life, and performance at a low temperature.

2. Description of the Related Art

The development of portable electronic devices has led to a corresponding increase in the demand for secondary batteries having both a lighter weight and a higher capacity. To satisfy these demands, the most promising approach is a lithium-sulfur battery with a positive electrode made of sulfur-based compounds.

Lithium-sulfur batteries use sulfur-based compounds with sulfur-sulfur bonds as a positive active material, and a lithium metal or a carbon-based compound as a negative active material. The carbon-based compound is one which can reversibly intercalate or deintercalate metal ions, such as lithium ions. Upon discharging (i.e., electrochemical reduction), the sulfur-sulfur bonds are cleaved, resulting in a decrease in the oxidation number of sulfur (S). Upon recharging (i.e., electrochemical oxidation), the sulfur-sulfur bonds are reformed, resulting in an increase in the oxidation number of the S. The electrical energy is stored in the battery as the chemical energy during charging, and it is converted back to electrical energy during discharging.

With respect to specific density, the lithium-sulfur battery is the most attractive among the currently developing batteries since lithium has a 3,830 mAh/g of specific capacity, and sulfur has a 1,675 mAh/g of specific capacity. Further, the sulfur-based compounds are less costly than other materials and are environmentally friendly.

Nevertheless, no lithium-sulfur batteries have yet been made widely commercially available up to now. One reason these batteries have not been able to be commercialized thus far is due to the poor sulfur utilization over repeated cycling, resulting in a low capacity. The sulfur utilization is referred to as a ratio of the amount of the sulfur involved in the electrochemical redox reaction of batteries to the amount of total injected sulfur. Further, the sulfur is diffused away to electrolytes upon the redox reaction so as to deteriorate the cycle life characteristics. Accordingly, unless the electrolyte is suitable, the reduced product of the sulfur, lithium sulfide ($Li_2S$), is deposited and, as a result, does not participate in further electrochemical reactions.

U.S. Pat. No. 6,030,720 describes liquid electrolyte solvents including a main solvent having the general formula $R_1(CH_2CH_2O)_nR_2$, where n ranges between 2 and 10, $R_1$ and $R_2$ are different or identical alkyl or alkoxy groups, and having a donor solvent of a donor number of 15 or more. Further, it includes a liquid electrolyte solvent including a solvent having at least one of a crown ether, a cryptand, and a donor solvent, which are solvents generating a catholyte after discharging. Despite using this kind of electrolyte, however, lithium-sulfur batteries have failed to obtain satisfactory capacity, high rate performance, or cycle life characteristics.

According to current research, an electrolyte of salts and an organic solvent are anticipated to provide lithium ion batteries with a high ion conductivity and a high oxidation potential. In such lithium ion batteries, lithium salts such as $LiClO_4$, $LiBF_4$, or $LiPF_6$ are mainly used. U.S. Pat. No. 5,827,602 describes non-aqueous batteries having lithium salts comprising triflate, imide, or methide-based anions. The aforementioned electrolyte shows good performance for lithium ion batteries. However, in lithium-sulfur batteries, the electrolyte causes problems by deteriorating the battery performance. This deterioration is due to the electrochemical reaction of the polysulfide being very unstable in a carbonate-based electrolyte, which is the most commonly used electrolyte in lithium-ion batteries. Thus, the lithium-sulfur batteries cannot effectively use the electrolyte present in the lithium-ion batteries. The electrolyte usable in lithium-sulfur batteries needs to have a stable electrochemical reaction with the polysulfide and needs to have the highly concentrated polysulfide generated by the reaction to be dissolvable.

Recently, attention has been drawn to a liquid-phase imidazolium cation-based salt usable at room temperature, commercially available as IONIC LIQUIDS. These cation-based salts are non-aqueous electrolyte salts capable of being applied to an electrical storage device such as a high-capacity capacitor or a battery (Koch, et al., *J. Electrochem. Soc.*, Vol. 143, p 155, 1996). As disclosed in U.S. Pat. No. 5,965,054, a non-aqueous electrolyte containing a liquid salt such as 1-ethyl-3-methylimidazolium hexafluorophosphate ($EMIPF_6$) is useful, having a high conductivity (>13 mS/cm), a large window of electrochemical stability (>2.5 V), a high salt concentration (>1M), high thermal stability (>100° C.), and a large capacitance (>100 F/g) from activated carbon electrode, in a double-layer capacitor.

Further, U.S. Pat. No. 5,965,054 discloses a liquid salt and an electrolyte in which the liquid salt is mixed with various carbonate-based organic solvents (*J. Electrochem. Soc.* Vol. 146. p1687, 1999). The electrolyte shows improved characteristics, such as a high ion conductivity (>60 mS/cm), a large window of electrochemical stability (>4 V at 20 $uA/cm^2$), and a higher salt concentration (>3M). U.S. Pat. No. 5,973,913 discloses that, when the electrical storage devices such as an electrochemical capacitor or a battery have used the electrolytes including the above-mentioned liquid salts, they have improved characteristics such as a high capacitance and a high energy density.

However, despite the fact that the battery performance depends upon the kind and composition of the salt and organic solvent used in the electrolytes, none of the above-mentioned patents and articles concretely disclose an optimum kind and composition of salts and organic solvents for lithium-sulfur batteries, where the salts provide a high capacity, an excellent high rate performance, and a good performance at a low temperature. Particularly, lithium-sulfur batteries having liquid salts have thus far not been developed.

SUMMARY OF THE INVENTION

It is an object of the present invention to provide a lithium-sulfur battery having high capacity and good cycle life characteristics, high rate performances and performance at a low temperature.

Additional objects and advantages of the invention will be set forth in part in the description which follows and, in part, will be obvious from the description, or may be learned by practice of the invention.

In order to realize the above and other objects, the present invention provides an electrolyte for use in a lithium-sulfur battery that includes salts of an organic cation to dissolve a sulfur-based positive active material and having a high ion conductivity.

According to another embodiment of the present invention, a lithium-sulfur battery includes a positive electrode having at least one positive active material selected from the group consisting of an elemental sulfur, $Li_2S_n$ ($n \geq 1$), $Li_2S_n$ ($n \geq 1$) dissolved in catholytes, an organosulfur compound, and a carbon-sulfur polymer (($C_2S_x)_n$: x=2.5~50, n≥2), an electrolyte having salts of an organic cation, and a negative electrode having a negative active material selected from the group consisting of a material capable of reversibly intercalating/deintercalating lithium ions, a material capable of reversibly forming a lithium-containing compound by a reaction with lithium ions, a lithium metal, and a lithium alloy.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE EMBODIMENTS

Figure 1:
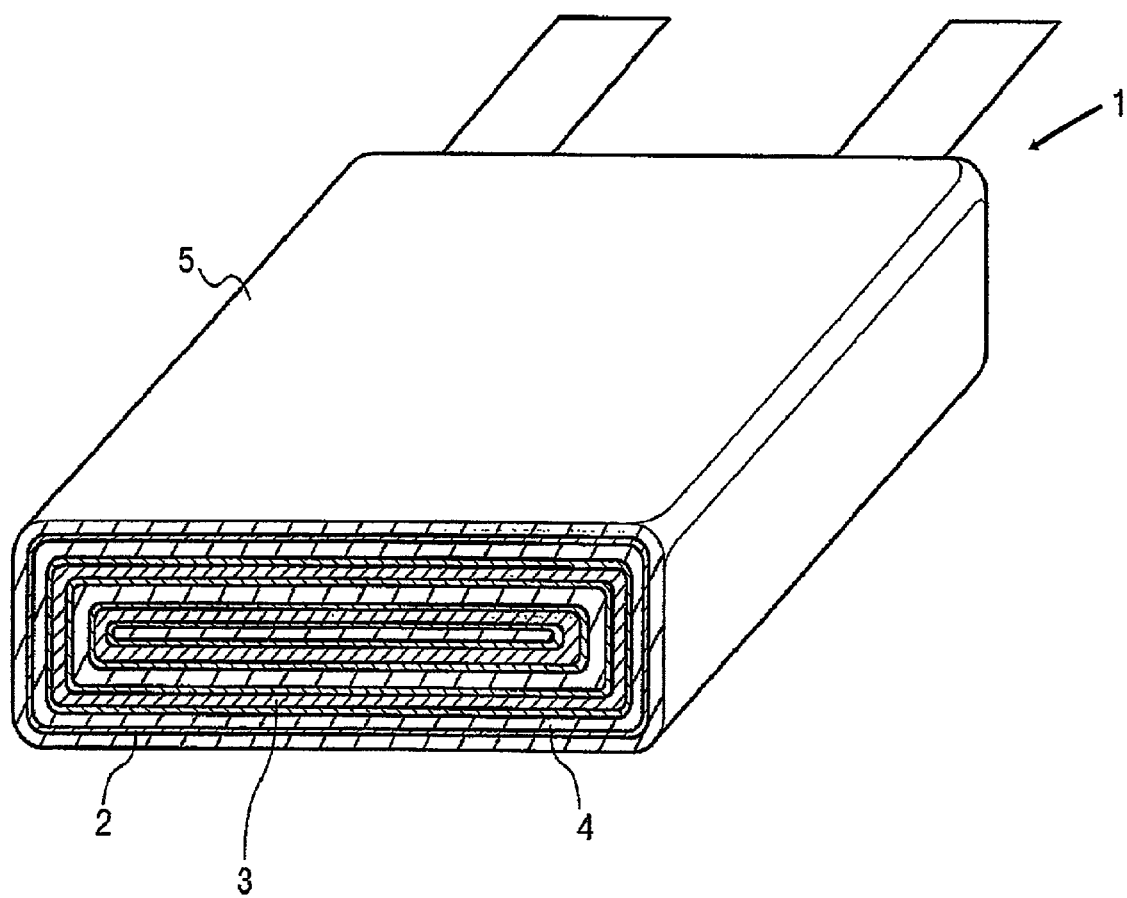
FIG. 1 is a perspective view of a battery according to an embodiment of the present invention.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

When lithium-sulfur batteries are discharged, elemental sulfur ($S_8$) is reduced so as to generate sulfide ($S^{-2}$) or polysulfide ($S_n^{-1}$, $S_n^{-2}$, wherein, $n \geq 2$). Thus, lithium-sulfur batteries use the elemental sulfur, lithium sulfide ($Li_2S$) or lithium polysulfide ($Li_2S_n$, wherein n=2, 4, 6, or 8) as a positive active material. Among these, the elemental sulfur has a low polarity, while the lithium sulfide and the lithium polysulfide have a high polarity. Further, the lithium sulfide is present in a precipitated state, but lithium polysulfide is present in a dissolved sate. In order to carry out an electrochemical reaction with the various states of the sulfur-based materials, it is important to select a suitable electrolyte to dissolve all kinds of sulfur-based materials. Conventionally, the electrolyte used in lithium-sulfur batteries is an organic solvent that can dissolve solid-phase lithium salts.

In a lithium-sulfur battery of an embodiment of the present invention, the electrolyte is a salt having an organic cation that is capable of dissolving sulfur-based positive active material, and has a high ion conductivity. The salts having the organic cation do not contain lithium ions. Further, the stability of the battery can be improved since it has a low vapor pressure and a high flash point so it would be non-combustible. The battery also has advantages of a lack of corrosiveness and a capability to be processed in a film form, which is mechanically stable. The salt of the present invention comprises relatively large-sized organic cations having a van der Waals volume of 100 $Å^3$ or more, but it is understood other sizes can be used. As the van der Waals volume increases, the lattice energy reduces, which results in enhancing ion conductivity. The electrolyte therefore is able to improve the sulfur utilization in a lithium-sulfur battery.

According to embodiments of the invention, the salt may be present in a liquid state at a broad range of temperatures, particularly at a working temperature so as to be capable of being used as an electrolyte. Thus, the salt is present in a liquid state at a temperature of 100° C. or lower, preferably at 50° C. or lower, and more preferably, 25° C. or lower. However, it is understood that other working temperatures are possible depending on the application.

While others may be used, the organic cation of the salt is a cation of heterocyclic compounds. The heteroatom of the heterocyclic compound is selected from N, O, or S, or a combination thereof. The number of heteroatoms is from 1 to 4, and preferably 1 or 2. Examples of the cation of the heterocyclic compound include, but are not limited to, one selected from the group consisting of pyridinium, pyridazinium, pyrimidinium, pyrazinium, imidazolium, pyrazolium, thiazolium, oxazolium, and triazolium, or substitutes thereof. Preferably, the organic cation includes a cation of an imidazolium compound such as 1-ethyl-3-methylimidazolium (EMI), 1,2-dimethyl-3-propylimidazolium (DMPI), 1-butyl-3-methylimidazolium (BMI), and so on.

The anion to be linked with the cation is one selected from the group consisting of bis(perfluoroethylsulfonyl)imide ($N(C_2F_5SO_2)_2^-$, Beti), bis(trifluoromethylsulfonyl)imide ($N(CF_3SO_2)_2^-$, Im), tris(trifluoromethylsulfonyl)methide ($C(CF_3SO_2^-$, Me), trifluoromethane sulfonimide, trifluoromethylsulfonimide, trifluoromethylsulfonate, $AsF_9^-$, $ClO_4^-$, $PF_6^-$, and $BF_4^-$.

Examples of the salt according to the present invention include, but are not limited to, 1-ethyl-3-methylimidazolium bis(perfluoroethyl sulfonyl) imide (EMIBeti), 1,2-dimethyl-3-propylimidazolium bis(trifluoromethyl sulfonyl)imide (DMPIIm), 1-butyl-3-methylimidazolium hexafluorophosphate ($EMIPF_6$), and so on.

The content of salt is 80% or less by volume. However, the content of the salt is preferably 0.001 to 60% by volume, still more preferably 0.01 to 40% by volume, even still more preferably 0.01 to 20% by volume, yet more preferably 5 to 20% by volume, and yet even more preferably 5 to 10% by volume based on the total electrolyte. Further, the content of the salt is 90% or less by weight, preferably 0.001 to 70% by weight, and more preferably 0.01 to 50% by weight of the total electrolyte.

Although the electrolyte of a lithium-sulfur battery may use only the salts having the organic cations, the electrolyte according to another embodiment of the present invention uses a mixture in which a solid-phase lithium salt is added to the salts. The lithium salt can include any lithium salt that is a conventional lithium salt to be added to an electrolyte for batteries. Examples of the lithium salts include, but are not limited to, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein x and y are natural numbers), LiCl, LiI and so on. Among them, lithium hexafluorophosphate ($LiPF_6$), lithium tetrafluoroborate ($LiBF_4$), lithium hexafluoroarsenate (LiAsF6), lithium perchlorate ($LiClO_4$), lithium bis(trifluoro methylsulfonyl) imide ($LiN(CF_3SO_2)_2$), lithium bis(perfluoroethylsulfonyl) imide ($LiN(C_2F_5SO_2)_2$), and lithium trifluorosulfonate ($CF_3SO_3Li$) are preferable. The concentration of the lithium salt is in the range between 0 and 4 M, and preferably in the range between 0.05 and 1.5 M.

The electrolyte of another embodiment of the present invention further includes an organic solvent as well as the salt having the organic cations. The organic solvent includes any conventional organic solvent used in a lithium-sulfur battery. Examples of the organic solvent include, but are not limited to, dimethoxy ethane, dioxolane, and so on. The content of the dimethoxy ethane is from 0 to 90% by volume, and preferably from 0 to 80% by volume, of the total electrolyte. The dioxolane is used between 0 and 60% by volume, and preferably between 0 and 30% by volume, of the total electrolyte.

The organic solvent is either a single component solvent, or a mixed organic solvent including two or more of the organic components as in the present inventive electrolyte. According to an embodiment of the invention using the mixed organic solvent, the mixed organic solvent includes at least two groups selected from a weak polar solvent group, a strong polar solvent group and a lithium protecting solvent group. However, the mixed organic solvent need not include the at least two groups in all circumstances.

The term "weak polar solvent," as used herein, is defined as a solvent capable of dissolving elemental sulfur and having a dielectric constant of less than 15. The weak polar solvent is selected from an aryl compound, a bicyclic ether, or an acyclic carbonate.

The term "strong polar solvent," as used herein, is defined as a solvent capable of dissolving lithium polysulfide and having a dielectric constant of more than 15. The strong polar solvent is selected from a bicyclic carbonate compound, a sulfoxide compound, a lactone compound, a ketone compound, an ester compound, a sulfate compound, or a sulfite compound.

The term "lithium protecting solvent," as used herein, is defined as a solvent capable of providing the surface of the lithium metal with a good protective layer (i.e., a stable solid-electrolyte interface (SEI) layer), and capable of showing a good cycle efficiency of 50% or more. The lithium protecting solvent is selected from a saturated ether compound, an unsaturated ether compound, or a heterocyclic compound including N, O, or S, or a combination thereof.

Examples of the weak polar solvents include, but are not limited to, xylene, dimethoxyethane, 2-methyltetrahydrofuran, diethyl carbonate, dimethyl carbonate, toluene, dimethyl ether, diethyl ether, diglyme, tetraglyme, and so on.

Examples of the strong polar solvents include, but are not limited to, hexamethyl phosphoric triamide, γ-butyrolactone, acetonitrile, ethylene carbonate, propylene carbonate, N-methyl pyrrolidone, 3-methyl-2-oxazolidone, dimethyl formamide, sulfolane, dimethyl acetamide, dimethyl sulfoxide, dimethyl sulfate, ethylene glycol diacetate, dimethyl sulfite, ethylene glycol sulfite, and so on.

Examples of the lithium protective solvents include, but are not limited to, tetrahydrofuran, ethylene oxide, dioxolane, 3,5-dimethylisoxazole, 2,5-dimethyl furan, furan, 2-methylfuran, 1,4-oxane, 4-methyldioxolane, and so on.

As shown in FIG. 1, a lithium-sulfur battery according to an embodiment of the present invention includes a case 1 containing a positive electrode 3, a negative electrode 4, and a separator 2 interposed between the positive electrode 3 and the negative electrode 4. An electrolyte is disposed between the positive and negative electrodes 3 and 4 and includes a salt having an organic cation.

The positive electrode 3 includes sulfur-based compounds for a positive active material, which include at least one selected from the group consisting of elemental sulfur, $Li_2S_n$ (wherein $n \geq 1$), $Li_2S_n$ (wherein $n \geq 1$) dissolved in a catholyte, an organosulfur compound, and a carbon-sulfur polymer (($C_2S_x)_n$: wherein x=2.5~50, $n \geq 2$).

According to an additional embodiment, the positive electrode 3 may optionally include at least one additive selected from the group consisting of a transition metal, a Group IIIA element, a Group IVA element, a sulfur compound thereof, and alloys thereof. The transition metal is preferably, but not limited to, at least one selected from the group consisting of Sc, Ti, V, Cr, Mn, Fe, Co, Ni, Cu, Zn, Y, Zr, Nb, Mo, Tc, Ru, Rh, Pd, Ag, Cd, Ta, W, Re, Os, Ir, Pt, Au, and Hg. The Group IIIA elements preferably include Al, Ga, In, and Tl, and the group IVA elements preferably include Si, Ge, Sn, and Pb.

According to further embodiments of the present invention, the positive electrode 3 further includes electrically conductive materials that facilitate the movement of the electrons within the positive electrode. Examples of the conductive materials include, but are not limited to, a conductive material such as graphite or carbon-based materials, or a conductive polymer. The graphite based material includes KS 6 (manufactured by Timcal Company), the carbon-based material includes SUPER P (manufactured by MMM Company), ketchen black, denka black, acetylene black, carbon black, and so on. Examples of the conductive polymer include, but are not limited to, polyaniline, polythiophene, polyacetylene, polypyrrole, and so on. The conductive material can be used singularly or as a mixture of two or more thereof according to embodiments of the invention.

According to yet another embodiment, a binder is added to enhance the adherence of the positive active material to the current collector. Examples of the binder include poly (vinyl acetate), poly vinyl alcohol, polyethylene oxide, polyvinyl pyrrolidone, alkylated polyethylene oxide, cross-linked polyethylene oxide, polyvinyl ether, poly(methyl methacrylate), polyvinylidene fluoride, a copolymer of polyhexafluoro propylene and polyvinylidene fluoride (marketed under the name of KYNAR), poly(ethyl acrylate), polytetrafluoro ethylene, polyvinyl chloride, polyacrylonitrile, polyvinylpyridine, polystyrene, and derivatives, blends, and copolymers thereof.

A method of preparing a positive electrode 3 according to an embodiment of the invention will now be illustrated in more detail. A binder is dissolved in a solvent and a conductive material is dispersed therein to obtain a dispersion solution. Any solvent may be used so long as it is capable of homogeneously dispersing a sulfur-based compound, the binder, and the conductive material. Useful solvents include, but are not limited to, acetonitrile, methanol, ethanol, tetrahydrofuran, water, isopropyl alcohol, dimethyl formamide, and so on.

A sulfur-based compound and an optional additive are homogeneously dispersed in the dispersion solution to prepare a positive electrode slurry. The amounts of the solvent, the sulfur compound, and the optional additive are not critical, but are sufficient to provide a suitable viscosity such that the slurry can easily be coated.

The prepared slurry is coated onto a current collector, and the coated collector is vacuum dried to prepare a positive electrode. The slurry is coated to a certain thickness, depending on the viscosity of the slurry and the thickness of the positive electrode to be prepared. Examples of the current collector include, but are not limited to, a conductive material such as stainless steel, aluminum, copper, or titanium. It generally is preferable to use a carbon-coated aluminum current collector. The carbon-coated aluminum current collector has excellent adhesive properties for adhering to the active materials, shows a lower contact resistance, and shows a better resistance to corrosion caused by the polysulfide as compared to an uncoated aluminum current collector.

The negative electrode includes a negative active material selected from a material in which the lithium intercalation reversibly occurs, materials in which a lithium-containing compound is reversibly generated by reacting with lithium ions, lithium alloys, or lithium metals. The materials in which lithium intercalation reversibly occurs are carbon-based compounds. Any carbon material may be used as long as it is capable of intercalating and deintercalating lithium ions. Examples of the carbon material include, but are not limited to, crystalline carbon, amorphous carbon, or a mixture thereof. Further, examples of materials in which a lithium-containing compound is reversibly generated by reacting with lithium ions include, but are not limited to, tin dioxide ($SnO_2$), titanium nitrate, silicon, and so on. Examples of the metals capable of forming the lithium alloys include, but are not limited to, Na, K, Rb, Cs, Fr, Be, Mg, Ca, Sr, Ba, Ra, Al, and Sn.

A material laminated with an inorganic protective layer, an organic protective layer, or a mixture thereof on the surface of the lithium metal is used as a negative electrode according to embodiments of the invention. Examples of the materials used as an inorganic protective layer include, but are not limited to, the material selected from the group consisting of Mg, Al, B, C, Sn, Pb, Cd, Si, In, Ga, lithium silicate, lithium borate, lithium phosphate, lithium phosphornitride, lithium silicosulfide, lithium borosulfide, lithium aluminosulfide and lithium phophosulfide. Examples of the organic protective materials include, but are not limited to, conductive monomers, oligomers, or polymers selected from the group consisting of poly(p-phenylene), polyacetylene, poly(p-phenylene vinylene), polyanyline, polypyrrol, polythiophene, poly(2,5-ethylene vinylene), acetylene, poly(perinaphthalene), polyacene, and poly(naphthalene-2,6-diyl).

Further, during the charging and discharging of the lithium-sulfur batteries, the sulfur used as a positive active material may be inactivated and be attached to the surface of the lithium negative electrode. The inactive sulfur is a sulfur that is incapable of being involved in a further electrochemical reaction of the positive electrode resulting from undergoing a variety of electrochemical or chemical reactions. On the other hand, the inactive sulfur has advantages in that it forms a protective layer for the lithium negative electrode. Accordingly, the lithium metals and the inactive sulfur formed on the lithium metal, for example, lithium sulfide, may be used as the negative electrode.

A porosity of the electrode is a very important factor in determining the amount of impregnation of an electrolyte. If the porosity is very low, discharging occurs locally, which causes unduly concentrated lithium polysulfide and makes precipitation easy, which decreases the sulfur utilization. Meanwhile, if the porosity is very high, the slurry density becomes low so that it is difficult to prepare a battery with a high capacity. Thus, the porosity of the positive electrode according to an embodiment of the invention is at least 5% of the volume of the total positive electrode, preferably at least 10%, and more preferably 15 to 50%.

According to additional embodiments of the invention, a polymer layer of polyethylene or polypropylene, or a multi-layer thereof is used as a separator between the positive electrode and the negative electrode.

Hereinafter, the present invention will be explained in detail with reference to specific examples. These specific examples, however, should not in any sense be interpreted as limiting the scope of the present invention and equivalents thereof.

EXAMPLE 1

67.5 wt. % elemental sulfur, 11.4 wt. % ketchen black as a conductive material, and 21.1 wt. % polyethylene oxide as a binder were mixed in an acetonitrile solvent to prepare a positive active material slurry for a lithium-sulfur battery cell. The slurry was coated on a carbon-coated Al current collector. The slurry-coated current collector was dried in a vacuum oven at 60° C. for over 12 hours. Thereby, the positive electrode with a current density of 2 mAh/$cm^2$ was prepared to 25×50 $mm^2$ in size. The positive electrode, the vacuum dried separator, and the negative electrode were laminated and transferred into a pouch. An electrolyte of 0.5 M $LiSO_3CF_3$ in a mixed solvent of dimethoxyethane/1-ethyl-3-methylimidazolium bis(perfluoroethyl sulfonyl) imide (EMIBeti)/dioxolane in the volume ratio of 75:5:20 was injected into said pouch. Thereafter, the pouch was sealed and the resultant pouch-type test cell was fabricated.

EXAMPLE 2

A cell was fabricated by the same procedure as described in Example 1 except that an electrolyte of 0.5 M $LiSO_3CF_3$ in a mixed solvent of dimethoxy ethane/EMIBeti/dioxolane in the volume ratio of 70:10:20 was used.

EXAMPLE 3

A cell was fabricated by the same procedure as described in Example 1 except that an electrolyte of 0.5 M $LiPF_6$ in a mixed solvent of dimethoxy ethane/$EMIPF_6$/dioxolane in the volume ratio of 75:5:20 was used.

EXAMPLE 4

A cell was fabricated by the same procedure as described in Example 1 except that an electrolyte of 0.5 M $LiPF_6$ in a mixed solvent of dimethoxy ethane/$EMIPF_6$/dioxolane in the volume of 70:10:20 was used.

EXAMPLE 5

A cell was fabricated by the same procedure as described in Example 1 except that an electrolyte of EMIBeti was used.

EXAMPLE 6

A cell was fabricated by the same procedure as described in Example 1 except that an electrolyte of 0.5 M $LiSO_3CF_3$ in EMIBeti was used.

COMPARATIVE EXAMPLE 1

A cell was fabricated by the same procedure as described in Example 1 except that an electrolyte of 1.0 M $LiSO_3CF_3$ in a mixed solvent of dimethoxy ethane/dioxolane in the volume ratio of 80:20 was used.

COMPARATIVE EXAMPLE 2

A cell was fabricated by the same procedure as described in Example 1 except that an electrolyte of 1.0 M $LiPF_6$ in a mixed solvent of dimethoxy ethane/dioxolane in the volume ratio of 80:20 was used.

COMPARATIVE EXAMPLE 3

A cell was fabricated by the same procedure as described in Example 1 except that an electrolyte of 1.0 M $LiSO_3CF_3$ in a mixed solvent of dimethoxy ethane/diglyme/sulfolane/dioxolane in the volume ratio of 20:20:10:50 was used.

Evaluation of Cycle Life Characteristics

Cycle life characteristics of the test cells according to Examples 1 to 6 and Comparative Examples 1 to 3 were evaluated at ambient temperature. The lithium-sulfur battery was initially discharged for 1 cycle at a discharging current density of 0.2 $mA/cm^2$, since the test cell had been charged on cell formation. To monitor the change of the capacity depending upon the discharge current, a charge current density was set to 0.4 $mA/cm^2$ and the discharge current density was varied to 0.2, 0.4, 1.0, and 2.0 $mA/cm^2$(C-rate is 0.1 C, 0.2 C, 0.5C, and 1 C, respectively) for 1 cycle, then the discharge current density was set to 1.0 $mA/cm^2$(0.5C), followed by charging and discharging for 50 cycles. The discharge cut-off voltage was set to 1.5~2.8 V.

Figure 2:
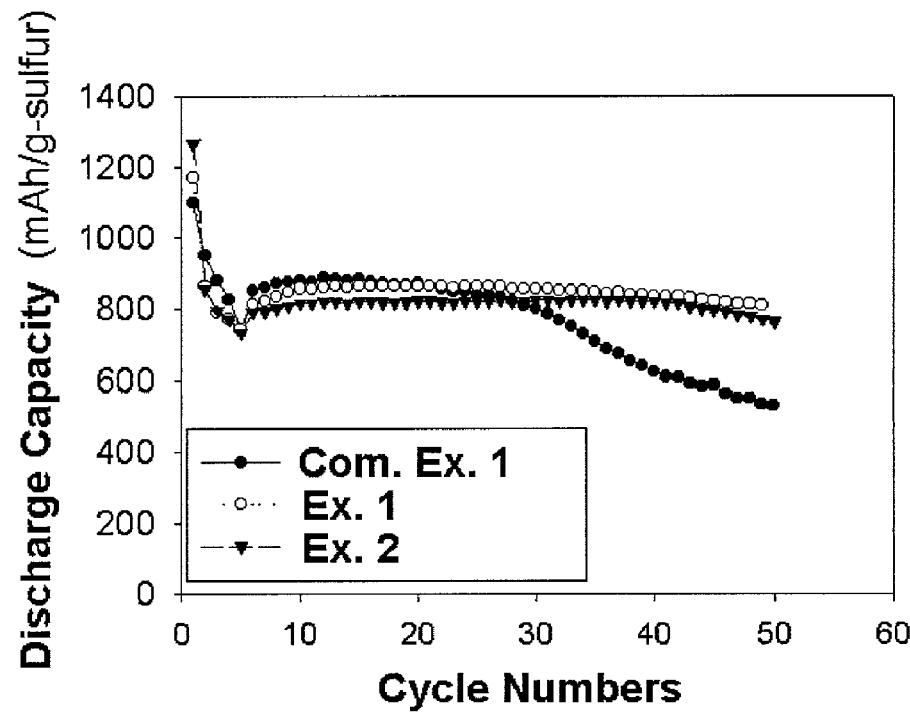
FIG. 2 illustrates a graph showing cycle life characteristics of cells fabricated by embodiments of the method of the present invention according to Example 1, Example 2, and Comparative Example 1.
Figure 3:
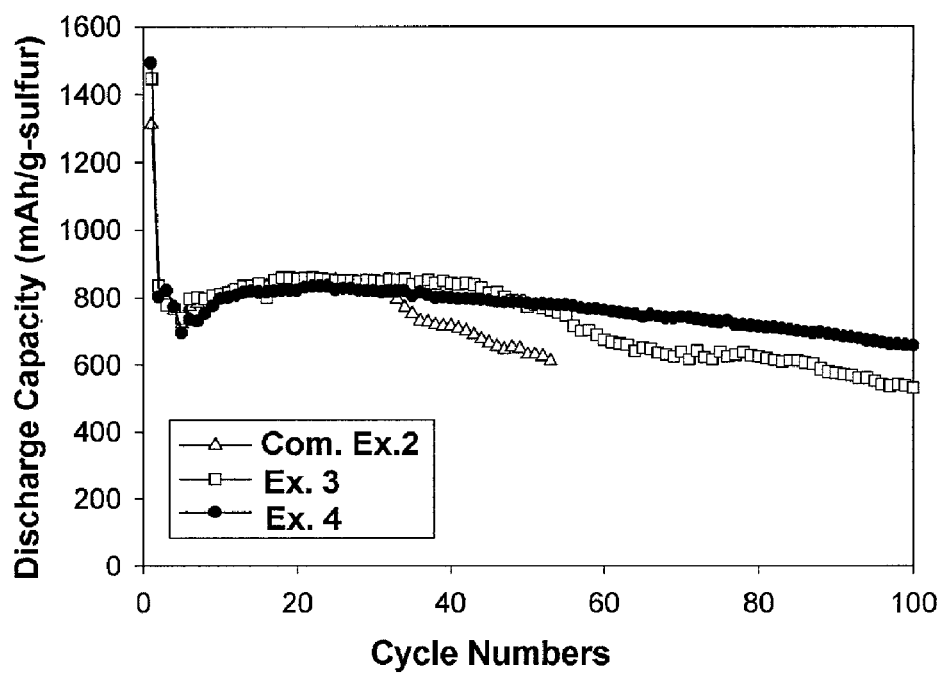
FIG. 3 illustrates a graph showing cycle life characteristics of cells fabricated by embodiments of the method of the present invention according to Example 3, Example 4, and Comparative Example 2.

FIG. 2 shows the cycle life characteristics by the number of cycles of cells according to Examples 1 and 2 and Comparative Example 1. As shown in FIG. 2, at initial charge-discharge cycles, the discharge capacities of the cells according to Examples 1 and 2 comprising EMIBeti salts were slightly lower as compared to that of Comparative Example 1. However, for over 30 cycles, the capacities of Examples 1 and 2 were maintained until 50 cycles, whereas the capacity of Comparative Example 1 was significantly decreased. FIG. 3 shows the cycle life characteristics of the cells according to Examples 3 and 4 and Comparative Example 2. As shown in FIG. 3, the capacities of Examples 1 and 2 maintained excellent levels through 1 to 100 cycles, but the capacity of Comparative Example 2 was significantly decreased after 30 cycles. It is shown that the cells according to the inventive Examples have superior sulfur utilization and stable cycle life characteristics.

Evaluation of Discharging Characteristics

Figure 4:
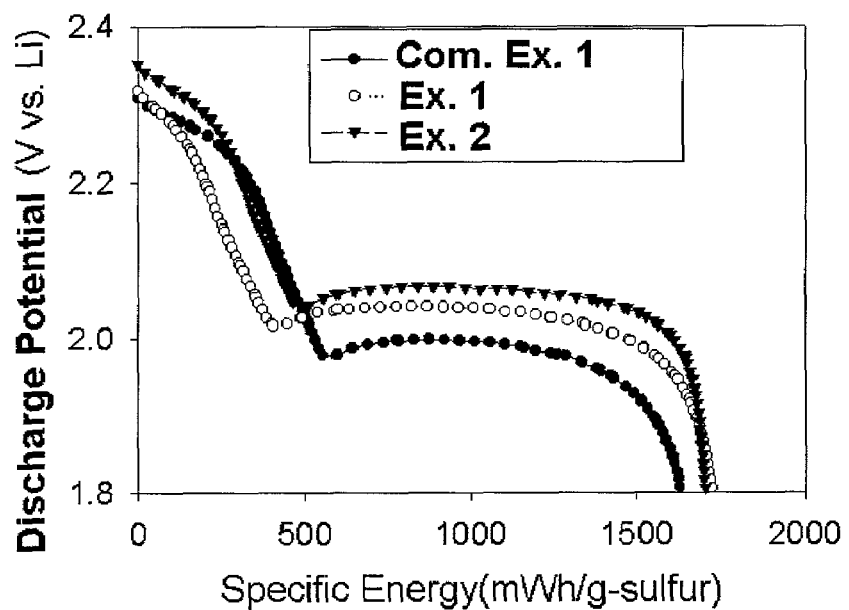
FIG. 4 illustrates the discharging characteristics at low rate of cells fabricated by embodiments of the method of the present invention according to Example 1, Example 2, and Comparative Example 1.
Figure 5:
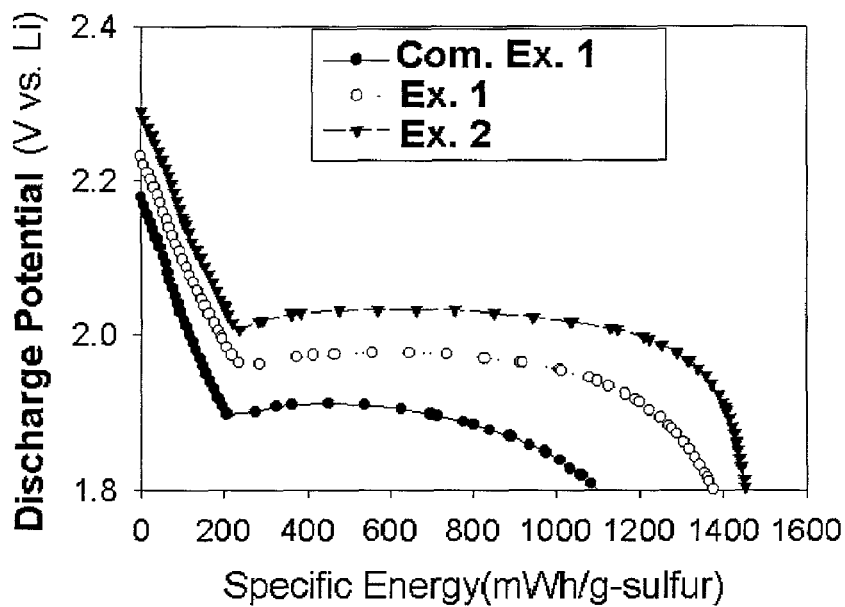
FIG. 5 illustrates the discharging characteristics at high rate of cells fabricated by embodiments of the method of the present invention according to Example 1, Example 2, and Comparative Example 1.

The charge and discharge evaluation was performed with the same procedure as described in evaluating the cycle life characteristics, except that the cut-off voltage was 1.8~2.8 V. FIG. 4 shows the results of Examples 1 and 2 and Comparative Example 1 when the discharge current density was 1.0 $mA/cm^2$(0.5 C), whereas FIG. 5 shows the results at the discharge current density of 2.0 $mA/cm^2$(1 C). The specific energy (mWh/g) was calculated by measuring an average discharge voltage and discharge capacity. In FIGS. 4 and 5, the x-axis represents specific density (average discharge voltage X discharge capacity), while the y-axis represents voltage.

As shown in FIGS. 4 and 5, the cells of Examples 1 and 2 are superior to the cell of Comparative Example 1 in terms of values of the average discharge voltage and specific density. The differences between values of the average discharge voltage and specific density are enlarged at a high rate (2.0 $mA/cm^2$ (1 C)) compared to the low rate density (1.0 $mA/cm^2$ (0.5 C). Therefore, the cells of Examples 1 and 2 have excellent discharge characteristics at a high rate as well as at a low rate.

Further, the average discharge voltage of the cell according to Example 2 comprising 10% by volume of EMIBeti is higher than that of Example 1 comprising 5% by volume of EMIBeti. Upon discharging at 1.0 $mA/cm^2$ (0.5 C), the specific density of Example 1 was similar to that of Example 2, whereas upon discharging at 2.0 $mA/cm^2$ (1 C), the specific density of Example 2 increased to more than that of Example 1.

Figure 6:
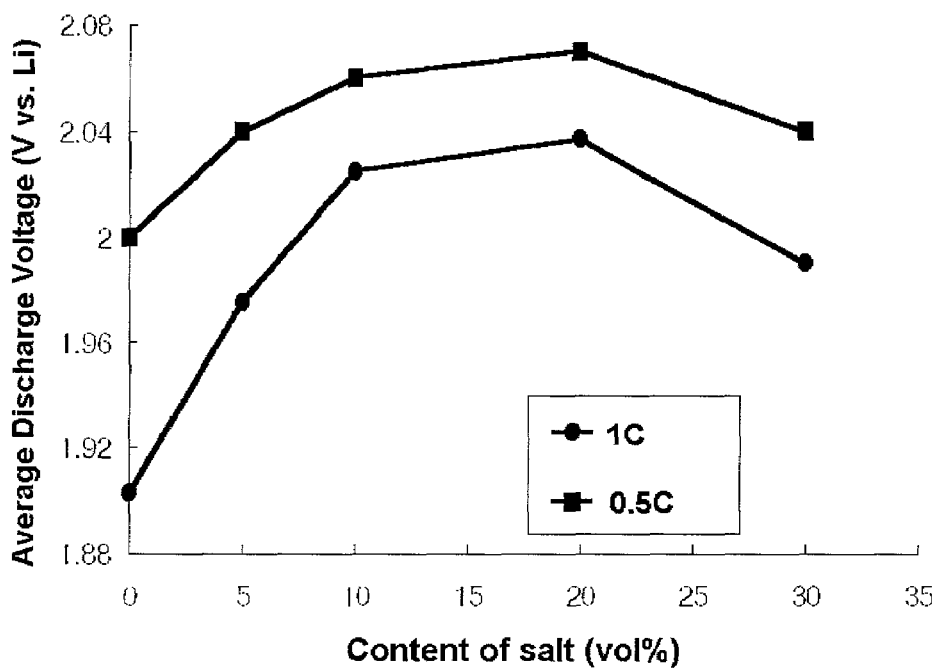
FIG. 6 illustrates an average discharge voltage of a lithium-sulfur battery cell depending upon the amount of salts in the electrolytes of an embodiment of the present invention.
Figure 7:
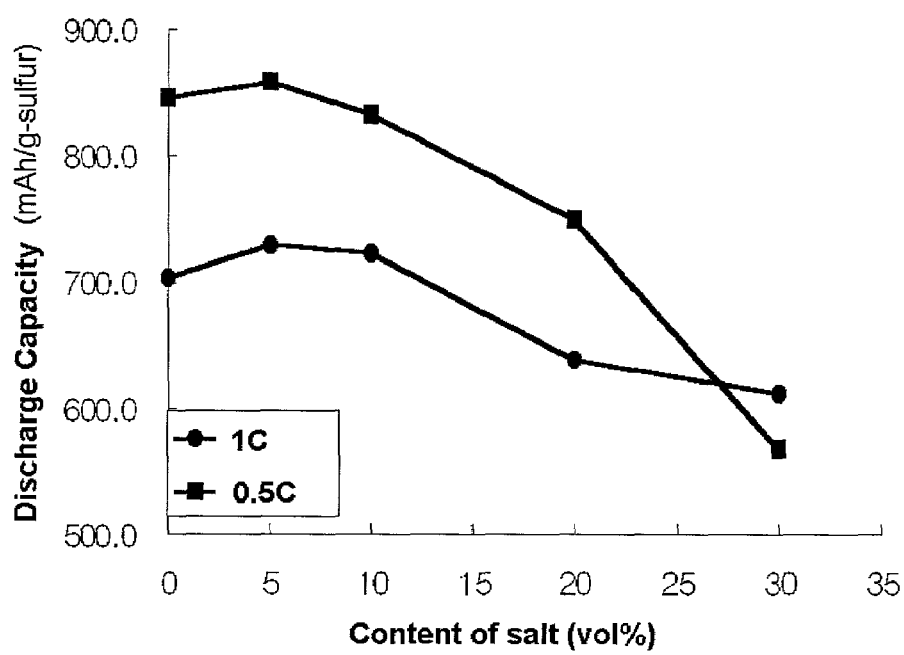
FIG. 7 illustrates a discharge capacity of a lithium-sulfur battery cell depending upon the amount of salts in the electrolytes an embodiment of the present invention.

FIGS. 6 and 7 show the average discharge voltage and discharge capacity measured on shifting the content of EMIBeti from 0 to 30% by volume in the electrolyte used in Example 1. As shown in FIGS. 6 and 7, it can be confirmed that the average discharge voltage and discharge capacity are excellent when the content of EMIBeti salts is between 5 and 10% by volume.

Evaluation of Performance at Low Temperature

The performance at a low temperature was evaluated with the test cells of Example 1, Example 2 and Comparative Example 1. The lithium-sulfur battery was initially discharged for 1 cycle at a discharge current density of 0.2 $mA/cm^2$ since the test cell was already charged. The charge current density was set to 0.4 $mA/cm^2$ and the discharge current density was varied to 0.2, 0.4, 1.0, and 2.0 $mA/cm^2$ (C-rate is 0.1 C, 0.2 C, 0.5 C, and 1 C, respectively) for 1 cycl and a charge and discharge were then performed at 0.4 $mA/cm^2$, which was set as the discharge capacity at an ambient temperature. Thereafter, the charge current density was maintained at 0.4 $mA/cm^2$ at the ambient temperature, followed by transferring the test cells to a low temperature of -10° C. and -20° C., leaving them for 2 hours, and discharging them at 0.4 $mA/cm^2$. Table 1 shows the discharge capacities on this occasion based on percent ratios compared to the discharge capacity at ambient temperature. The discharge cut-off voltage was set to 1.5~2.8 V.

TABLE 1

| Temperature | Example 1 | Example 2 |
| --- | --- | --- |
| -10° C. | 80% | 74% |
| -20° C. | 67% | 58% |

As shown in Table 1, the discharge capacity of the cell of Example 1 is superior to that of Example 2 at low temperatures.

In the Reference examples below, the electrochemical characteristics were evaluated when the electrolyte of the inventive lithium-sulfur batteries was used for lithium-ion batteries.

REFERENCE EXAMPLE 1

A binder (polyvinylidene fluoride) was added to N-methyl pyrrolidone (NMP) to provide a binder solution. A conductive material (Super P) and a positive active material of $LiCoO_2$ with an average particle size of 10 μm were added to the binder solution to prepare a positive active material slurry for a lithium-sulfur battery. The weight ratio for the positive active material/conductive material/binder was in 96:2:2. The slurry was coated on a carbon-coated Al foil. Then, the slurry-coated Al-foil was dried in a vacuum oven at 60° C. for over 12 hours. The positive electrode with a density of 2 mAh/cm² was then prepared to 25×50 mm² in size. The positive electrode, the vacuum dried separator, and the negative electrode were laminated and transferred into a pouch. The electrolyte of 1.0 M $LiSO_3CF_3$ in the mixed solvent of ethylene carbonate and dimethyl carbonate in the volume ratio of 1:1 was injected into said pouch to provide a pouch-type lithium ion cell.

REFERENCE EXAMPLE 2

A lithium ion cell was fabricated by the same procedure as described in Reference Example 1 except that an electrolyte of EMIBeti was used.

REFERENCE EXAMPLE 3

A lithium ion cell was fabricated by the same procedure as described in Reference Example 1 except that an electrolyte of 1.0 M $LiSO_3CF_3$ in EMIBeti was used.

REFERENCE EXAMPLE 4

A lithium cell was fabricated by the same procedure as described in Example 1 except that an electrolyte of 1.0 M $LiSO_3CF_3$ in a mixed solvent of dimethoxy ethane/EMIBeti/dioxolane in the volume ratio of 70:10:20 was used.

The lithium ion cells according to Reference Examples 2 to 4 have discharge capacities that are about 20% or less of that of Reference Example 1 and of about 10% or less of those of the above inventive Examples. Thus, the electrolyte that improves the lithium-sulfur batteries does not impart any improvements to the lithium-ion batteries. It seems that different electrolytes are required due to the difference in the active materials between the two kinds of batteries.

The lithium-sulfur batteries according to the present invention include organic cations other than lithium ions, and salts as electrolytes having excellent ion conductivity at ambient temperature resulting in increasing the sulfur utilization and improving cycle life characteristics and discharge characteristics such as discharge capacity and average discharge voltage and performance at low temperatures compared to conventional batteries using prior art electrolytes including organic solvents and solid-phase lithium salts.

While the present invention has been described in detail with reference to the preferred embodiments, those skilled in the art will appreciate that various modifications and substitutions can be made thereto without departing from the spirit and scope of the present invention as set forth in the accompanying claims and equivalents thereof.

What is claimed is:

1. A lithium-sulfur battery having an electrolyte comprising:
    a salt having an organic cation and which dissolves a sulfur-based positive active material of the lithium-sulfur battery and has a high ion conductivity, a content of said salt being 0.001% to 20% by volume based on the total electrolyte
    and wherein the lithium-sulfur battery further comprises a positive electrode having a sulfur and/or a sulfur compound as a positive active material wherein the positive active material is selected from the group consisting of an elemental sulfur, $Li_2S_n$ (n≧1), $Li_2S_n$ (n≧1) dissolved in catholytes, an organosulfur compound, and a carbon-sulfur polymer (($C_2S_x)_n$: x=2.5~50, n≧2).

2. The lithium-sulfur battery of claim 1, wherein said salt is present in a liquid state at working temperatures at or below 100° C.

3. The lithium-sulfur battery of claim 2, wherein said salt is in the liquid state at temperatures at or below 50° C.

4. The lithium-sulfur battery of claim 3, wherein said salt is in the liquid state at temperatures at or below 25° C.

5. The lithium-sulfur battery of claim 1, wherein the organic cation has a van der Waals volume of 100 Å³ or more.

6. The lithium-sulfur battery of claim 1, wherein the organic cation is a cation of a heterocyclic compound.

7. The lithium-sulfur battery of claim 6, wherein the heterocyclic compound includes a heteroatom selected from N, O, S, or a combination thereof.

8. The lithium-sulfur battery of claim 6, wherein the heterocyclic compound has a number of heteroatoms at or between 1 and 4.

9. The lithium-sulfur battery of claim 8, wherein the heterocyclic compound has a number of heteroatoms at or between 1 and 2.

10. The lithium-sulfur battery of claim 7, wherein the cation of the heterocyclic compound includes at least one selected from the group consisting of pyridinium, pyridazinium, pyrimidinium, pyrazinium, imidazolium, pyrazolium, thiazolium, oxazolium, and triazolium, and substitutes thereof.

11. The lithium-sulfur battery of claim 1, wherein the organic cation includes a cation of an imidazolium compound.

12. The lithium-sulfur battery of claim 11, wherein the imidazolium compound is at least one of 1-ethyl-3-methylimidazolium (EMI), 1,2-dimethyl-3-propylimidazolium (DMPI), and 1-butyl-3-methylimidazolium (BMI).

13. The lithium-sulfur battery of claim 1, wherein said salt further comprises an anion to be linked with the organic cation and which is selected from the group consisting of bis(perfluoroethylsulfonyl)imide ($N(C_2F_5SO_2)_2^-$, Beti), bis(trifluoromethylsulfonyl)imide ($N(CF_3SO_2)_2^-$, Im), tris(trifluoromethylsulfonyl)methide ($C(CF_3SO_2)_3^-$, Me), trifluoromethane sulfonimide, trifluoromethylsulfonimide, trifluoromethylsulfonate, $AsF_9^-$, $ClO_4^-$, $PF_6^-$, and $BF_4^-$.

14. The lithium-sulfur battery of claim 1, wherein said salt includes at least one of 1-ethyl-3-methylimidazolium bis(perfluoroethyl sulfonyl) imide (EMIBeti), 1,2-dimethyl-3-propylimidazolium bis(trifluoromethyl sulfonyl)imide (DMPIIm), and 1-butyl-3-methylimidazolium hexafluorophosphate ($EMIPF_6$).

15. The lithium-sulfur battery of claim 1, further comprising an organic solvent in which said salt is mixed.

16. The lithium-sulfur battery of claim 15, wherein the content of said salt is at or between 5% and 10% by volume based on the total electrolyte.

17. The lithium-sulfur battery of claim 15, wherein said organic solvent includes at least one of dimethoxy ethane, and dioxolane.

18. The lithium-sulfur battery of claim 17, wherein said organic solvent is dimethoxy ethane, and a content of the dimethoxy ethane is 90% or less by volume of the total electrolyte.

19. The lithium-sulfur battery of claim 17, wherein said organic solvent is dioxolane, and a content of the dioxolane is 60% or less by volume of the total electrolyte.

20. The lithium-sulfur battery of claim 15, wherein said organic solvent comprises at least two groups selected from a weak polar solvent group, a strong polar solvent group and a lithium protecting solvent group.

21. The lithium-sulfur battery of claim 20, wherein:
the weak polar solvent is selected from an aryl compound, a bicyclic ether, and an acyclic carbonate,
the strong polar solvent is selected from a bicyclic carbonate compound, a sulfoxide compound, a lactone compound, a ketone compound, an ester compound, a sulfate compound, and a sulfite compound, and
the lithium protecting solvent is selected from a saturated ether compound, an unsaturated ether compound, a heterocyclic compound including N, O, and S, and a combination thereof.

22. The lithium-sulfur battery of claim 1, further comprising a solid-phase lithium salt.

23. The lithium-sulfur battery of claim 22, wherein said lithium salt includes at least one of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein x and y are natural numbers), LiCl and LiI.

24. The lithium-sulfur battery of claim 22, wherein a concentration of said lithium salt is in a range between 0 and 4 M.

25. The lithium-sulfur battery of claim 24, wherein the concentration is in the range at or between 0.05 and 1.5 M.

26. The lithium-sulfur battery of claim 1, further comprising:
a positive electrode having a sulfur and/or a sulfur compound as a positive active material, wherein said positive electrode further comprises at least one additive selected from the group consisting of a transition metal, a Group IIIA element, a Group IVA element, a sulfur compound thereof, and alloys thereof; and
a negative electrode having a negative active material selected from the group consisting of a material capable of reversibly intercalating/deintercalating lithium ions, a material capable of reversibly forming a lithium-containing compound by a reaction with lithium ions, a lithium metal, and a lithium alloy.

27. The lithium-sulfur battery of claim 26, wherein:
the transition metal is at least one selected from the group consisting of Sc, Ti, V, Cr, Mn, Fe, Go, Ni, Cu, Zn, Y, Zr, Nb, Mo, Tc, Ru, Rh, Pd, Ag, Cd, Ta, W, Re, Os, Ir, Pt, Au, and Hg,
the Group IIIA elements includes at least one of Al, Ga, In, and Tl, and
the group IVA elements includes at least one of Si, Ge, Sn, and Pb.

28. The lithium sulfur battery of claim 26, wherein said positive electrode further comprises electrically conductive materials that facilitate the movement of electrons within said positive electrode.

29. The lithium sulfur battery of claim 26, wherein:
said positive electrode further comprises a current collector and a binder to adhere the positive active material to the current collector, and
the binder includes at least one of poly(vinyl acetate), poly vinyl alcohol, polyethylene oxide, polyvinyl pyrrolidone, alkylated polyethylene oxide, cross-linked polyethylene oxide, polyvinyl ether, poly(methyl methacrylate), polyvinylidene fluoride, a copolymer of polyhexafluoro propylene and polyvinylidene fluoride, poly (ethyl acrylate), polytetrafluoro ethylene, polyvinyl chloride, polyacrylonitrile, polyvinylpyridine, polystyrene, and derivatives, blends, and copolymers thereof.

30. The lithium-sulfur battery of claim 26, wherein said electrolyte further comprises an organic solvent, wherein a content of the salt is at or between 5 and 10% by volume based on the total electrolyte.

31. The lithium-sulfur battery of claim 26, wherein said electrolyte is present in a liquid state at working temperatures at or below 100° C.

32. The lithium-sulfur battery of claim 26, wherein the organic cation has a van der Waals volume of 100 Å$^3$ or more.

33. The lithium-sulfur battery of claim 26, wherein the organic cation is a cation of a heterocyclic compound.

34. The lithium-sulfur battery of claim 33, wherein the cation of the heterocyclic compound includes at least one selected from the group consisting of pyridinium, pyridazinium, pyrimidinium, pyrazinium, imidazolium, pyrazolium, thiazolium, oxazolium, and triazolium, and substitutes thereof.

35. The lithium-sulfur battery of claim 34, wherein the salt further comprises an anion to be linked with the organic cation and which is selected from the group consisting of bis(perfluoroethylsulfonyl)imide ($N(C_2F_5SO_2)^{2-}$, Beti), bis (trifluoromethylsulfonyl)imide ($N(CF_3SO_2)_2^-$, Im), tris(trifluoromethylsulfonyl)methide ($C(CF_3SO_2)_3^-$, Me), trifluoromethane sulfonimide, trifluoromethylsulfonimide, trifluoromethylsulfonate, $AsF_9^-$, $ClO_4^-$, $PF_6^-$, and $BF_4^-$.

36. The lithium-sulfur battery of claim 26, wherein the salt includes at least one of 1-ethyl-3-methylimidazolium bis(perfluoroethyl sulfonyl) imide (EMIBeti), 1,2-dimethyl-3-propylimidazolium bis(trifluoromethyl sulfonyl)imide (DMPIIm), and 1-butyl-3-methylimidazolium hexafluorophosphate ($EMIPF_6$).

37. The lithium-sulfur battery of claim 36, wherein said electrolyte further comprises an organic solvent that includes at least one of dimethoxy ethane, and dioxolane.

38. An electrolyte of a lithium-sulfur battery comprising:
a salt having an organic cation and being present in a liquid state at working temperatures at or below 100° C., the content of said salt being 0.001% to 20% by volume based on the total electrolyte and wherein the lithium-sulfur battery further comprises a positive electrode having a sulfur and/or a sulfur compound as a positive active material wherein the positive active material is selected from the group consisting of an elemental sulfur, $Li_2S_n$ (n≧1), $Li_2S_n$ (n≧1) dissolved in catholytes, an organosulfur compound, and a carbon-sulfur polymer (($C_2S_x)_n$: x=2.5 ~50, n≧2).

39. The electrolyte of claim 38, wherein said salt has a cation of a heterocyclic compound, the cation of the heterocyclic compound includes at least one selected from the group consisting of pyridinium, pyridazinium, pyrimidinium, pyrazinium, imidazolium, pyrazolium, thiazolium, oxazolium, and triazolium, and substitutes thereof.

40. The electrolyte of claim 38, wherein said salt has an organic cation of a heterocyclic compound, and an anion to be linked with the organic cation and which is selected from the group consisting of bis(perfluoroethylsulfonyl)imide ($N(C_2F_5SO_2)_2^-$, Beti), bis(trifluoromethylsulfonyl)imide ($N(CF_3SO_2)_2^-$, Im), tris(trifluoromethylsulfonyl)methide ($C(CF_3SO_2)_3^-$, Me), trifluoromethane sulfonimide, trifluoromethylsulfonimide, trifluoromethylsulfonate, $AsF_9^-$, $ClO_4^-$, $PF_6^-$, and $BF_4^-$.

41. The electrolyte of claim 38, wherein said salt includes at least one of 1-ethyl-3-methylimidazolium bis(perfluoroethylsulfonyl)imide (EMIBeti), 1,2-dimethyl-3-propylimidazolium bis(trifluoromethylsulfonyl)imide (DMPIIm), and 1-butyl-3-methylimidazolium hexafluorophosphate ($EMIPF_6$).

42. The electrolyte of claim 38, wherein said salt is in the liquid state at temperatures at or below 50° C.

43. The electrolyte of claim 38, wherein said salt is in the liquid state at temperatures at or below 25° C.

44. The electrolyte of claim 38, further comprising a solid-phase lithium salt.

45. The electrolyte of claim 44, wherein said lithium salt includes at least one of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein x and y are natural numbers), LiCl and LiI.

46. An electrolyte of a lithium-sulfur battery comprising:

a salt having an organic cation and which dissolves a sulfur-based positive active material of the lithium-sulfur battery and has a high ion conductivity, wherein said salt includes at least one of 1-ethyl-3-methylimidazolium bis(perfluoroethyl sulfonyl) imide (EMiBeti), 1,2-dimethyl-3-propylimidazolium bis(trifluoromethyl sulfonyl)imide (DMPI Im), and 1-butyl-3-methylimidazolium hexafluorophosphate ($EMIPF_6$); and a solid-phase lithium salt wherein said lithium salt includes at least one of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein x and y are natural numbers), LiCl and LiI, wherein the content of said salt is 0.001% to 20% by volume based on the total electrolyte and wherein the lithium-sulfur battery further comprises a positive electrode having a sulfur and/or a sulfur compound as a positive active material wherein the positive active material is selected from the group consisting of an elemental sulfur, $Li_2S_n$ ($n \geq 1$), $Li_2S_n$ ($n \geq 1$) dissolved in catholytes, an organosulfur compound, and a carbon-sulfur polymer (($C_2S_x)_n$: x=2.5~50, $n \geq 2$).

* * * * *

UNITED STATES PATENT AND TRADEMARK OFFICE
CERTIFICATE OF CORRECTION

PATENT NO. : 7,241,535 B2 Page 1 of 1
APPLICATION NO. : 10/096663
DATED : July 10, 2007
INVENTOR(S) : Seok Kim et al.

It is certified that error appears in the above-identified patent and that said Letters Patent is hereby corrected as shown below:

Column 12, line 59
change "$PF_{6-}$" to -- $PF_6$- --

Column 13, line 57
change "Go" to --Co--

Column 15, lines 12-13, change
"bis(perfluoroethylsulfonyl)imide" to --bis(perfluoroethyl sulfonyl)imide--

Column 15, line 14, change
"bis(trifluoromethylsulfonyl)imide" to --bis(trifluoromethyl sufonyl)imide--

Column 16, line 6
change "(EMiBeti)" to --(EMIBeti)--

Column 16, line 8
change "(DMPI Im)" to --(DMPIIm)--

Signed and Sealed this

Twentieth Day of November, 2007

JON W. DUDAS
*Director of the United States Patent and Trademark Office*